(12) United States Patent
Gupta et al.

(10) Patent No.: US 10,484,483 B1
(45) Date of Patent: Nov. 19, 2019

(54) METHOD AND SYSTEM FOR PROVIDING SOFTWARE FUNCTIONALITIES TO USERS OF MULTI-TENANT APPLICATIONS VIA INHERITANCE

(71) Applicant: EMC Corporation, Hopkinton, MA (US)

(72) Inventors: Gaurav Gupta, Bangalore (IN); Mridul Mudgal, Bangalore (IN); Vikas Ranganatha, Bangalore (IN); Shalini Sharma, Bangalore (IN); Manish Gurumoorthy, Dublin, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 765 days.

(21) Appl. No.: 14/871,548

(22) Filed: Sep. 30, 2015

(51) Int. Cl.
*H04L 29/08* (2006.01)
*H04L 12/24* (2006.01)

(52) U.S. Cl.
CPC .......... *H04L 67/16* (2013.01); *H04L 41/5054* (2013.01); *H04L 67/04* (2013.01); *H04L 67/10* (2013.01)

(58) Field of Classification Search
CPC ..... H04L 67/16; H04L 41/5054; H04L 67/04; H04L 67/10; H04L 67/141; H04L 67/32; H04L 43/50; H04L 67/02; H04L 67/30; H04L 67/303; H04L 67/306; G06F 17/30864; G06F 11/368; G06F 8/658
See application file for complete search history.

(56) References Cited

U.S. PATENT DOCUMENTS

| | | | |
|---|---|---|---|
| 2003/0236788 A1* | 12/2003 | Kanellos | G06F 16/20 |
| 2004/0060005 A1* | 3/2004 | Vasey | G06F 17/218 |
| | | | 715/234 |
| 2007/0088741 A1* | 4/2007 | Brooks | G06F 8/60 |
| 2007/0282800 A1* | 12/2007 | England | G06F 21/604 |
| 2012/0166488 A1* | 6/2012 | Kaushik | G06F 16/951 |
| | | | 707/795 |
| 2012/0291007 A1* | 11/2012 | Bagheri | G06Q 10/10 |
| | | | 717/106 |
| 2014/0173454 A1* | 6/2014 | Sanchez | G06F 8/20 |
| | | | 715/747 |

(Continued)

*Primary Examiner* — Patrice L Winder
*Assistant Examiner* — Aye M Aung
(74) *Attorney, Agent, or Firm* — Chamberlain, Hrdlicka, White, Williams & Aughtry (57) ABSTRACT

In general, embodiments of the technology relate to a method for providing software functionalities to users of multi-tenant applications via inheritance. The method includes defining a functionality to be inheritable by a tenant application, in a master application, including selecting the functionality from a set of implemented functionalities, and defining a scope for the selected functionality, and publishing the master application. The method further includes, after publishing the master application, receiving a request to generate a tenant application. The request specifies the master application and the functionality to be inheritable by the tenant application. The method also includes generating the tenant application in response to the request. Further, the method includes publishing the tenant application, including the functionality, to a set of users; and receiving a request to access the published tenant application from a user of the first set of users.

17 Claims, 6 Drawing Sheets

(56) References Cited

U.S. PATENT DOCUMENTS

| | | | |
|---|---|---|---|
| 2014/0282358 A1* | 9/2014 | Mowatt | G06F 8/70 |
| | | | 717/104 |
| 2014/0359557 A1* | 12/2014 | Rangwala | G06F 8/36 |
| | | | 717/105 |
| 2015/0319252 A1* | 11/2015 | Momchilov | H04L 67/141 |
| | | | 709/223 |
| 2016/0360005 A1* | 12/2016 | De Filippis | H04L 67/32 |

* cited by examiner

METHOD AND SYSTEM FOR PROVIDING SOFTWARE FUNCTIONALITIES TO USERS OF MULTI-TENANT APPLICATIONS VIA INHERITANCE

BACKGROUND

Multi-tenant systems may be used to enable multiple users to simultaneously access the multi-tenant systems.

DETAILED DESCRIPTION

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to providing server-based software applications to users, using a multi-tenant architecture. One or more embodiments of the technology include functionality for customizing the server-based, multi-tenant architecture-based software applications based on the needs of groups of users, and to provide the customized software applications to these groups of users.

More specifically, users with similar requirements, in accordance with one or more embodiments of the technology, form a tenant group that may rely on a tenant application, customized based on the need of these users. The tenant application may be derived from a master application that may incorporate a set of functionalities. Functionalities may include instructions implementing operations that may be necessary and/or useful for a user performing a task and may include, for example, the ability to read/write from/to a database, to automatically compose an email, to check in/check out documents, etc. Additional tenant applications that may inherit the same or different functionalities from the master application may be derived from the master application for additional tenant groups with different requirements, thus reusing the common functionalities, and thereby reducing build and deploy time. The functionalities inherited from the master application may be selectable and customizable. Further a tenant application may be customized to include functionalities not available in the master application.

A single tenant application, serving a tenant group, may therefore be instantiated on an application server. Additional tenant applications may be instantiated to serve additional tenant groups with different requirements.

In one or more embodiments of the technology, the software application may be part of a system that includes a central or distributed application server that may be used to maintain and provide access to a set of resources, e.g., content in the form of databases, etc., and client applications that enable users to access the resources via the application server. The system may be, for example, an enterprise content management (ECM) or an enterprise resource planning (ERP) system. The system may include cloud-based components, e.g., the application server may be cloud-based, using a software as a service (SaaS) model. In such a scenario, functionalities of the software application may be offered to users on a subscription basis that only requires the user to have access to a computing device with a web browser and internet access.

Figure 1:
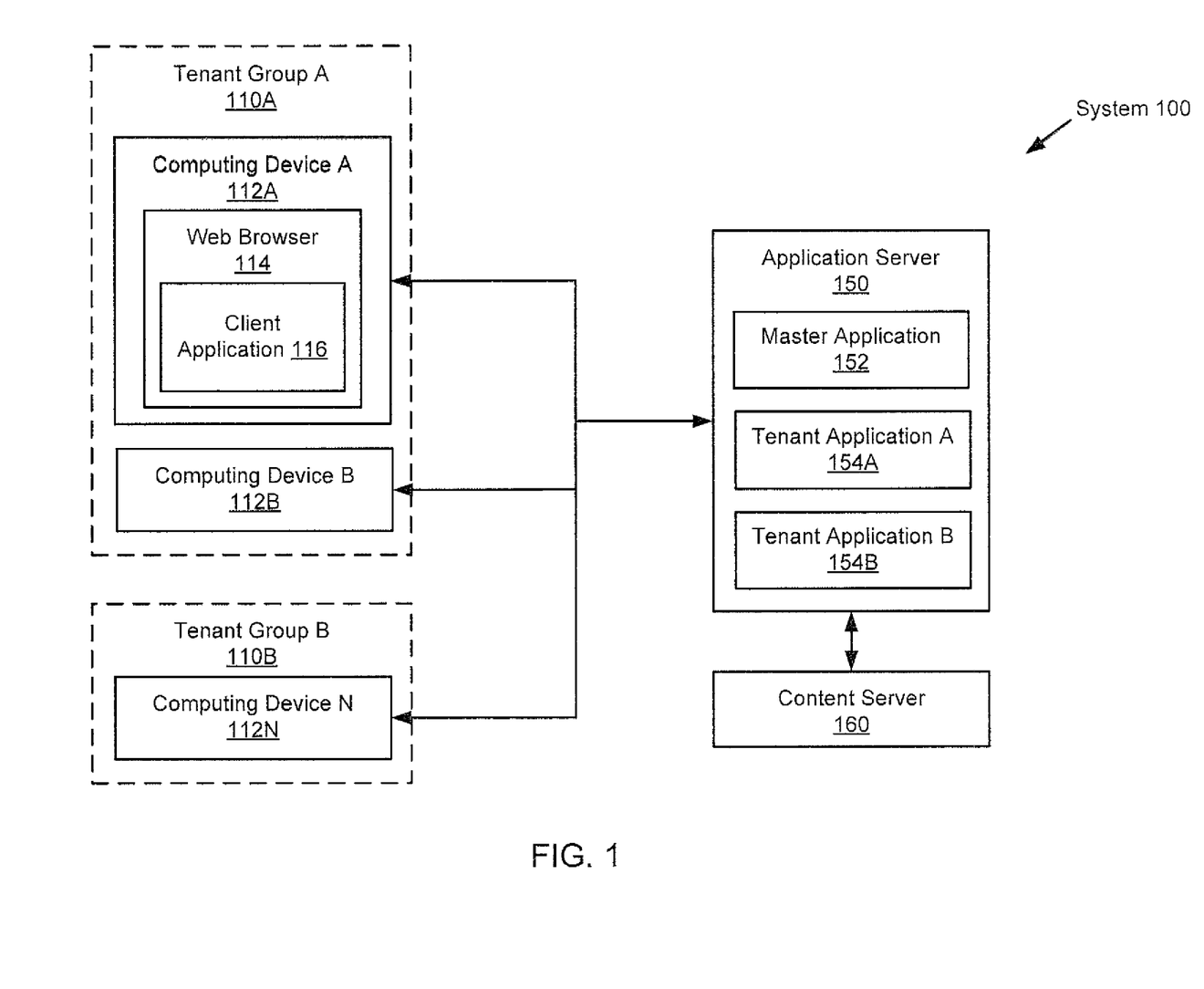
FIG. 1 shows a system in accordance with one or more embodiments of the technology.

FIG. 1 shows a schematic diagram of a system in accordance with one or more embodiments of the technology. Specifically, FIG. 1 shows a schematic diagram of a system (100) enabling users to access a server-based software application using a browser-based client application. As shown in FIG. 1, the system may include computing devices A-N (112A-112N) associated with various tenant groups (110A, 110B), an application server (150), and a content server (160). Each of these components is described below.

In one or more embodiments of the technology, a computing device (112A-112N) may be any type of mobile, desktop, server, embedded, or other hardware. The computing device may be connected to a network (e.g., a local area network (LAN), a wide area network (WAN) such as the Internet, mobile network, or any other type of network) via a network interface connection (not shown), thereby enabling the computing device to communicate with, for example, the application server (150).

In one or more embodiments of the technology, each computing device (112A-110N) may have executing thereon a web browser (114). The web browser may provide a platform for the execution of a client application (116), which may be displayed to the user of the computing device as one or more web pages. The web browser may be a software application for retrieving, presenting and traversing content resources (e.g. documents formatted and annotated with hypertext markup language (HTML), JavaScript, Cascading Style Sheets (CSS), and any language and/or any other language extensions necessary for executing the client application (116)).

In one or more embodiments of the technology, the web browser (114) may host the client application (116). A client application may be web browser-executable code (including, e.g., HTML, JavaScript and/or CSS elements) that provides a user interface enabling a user to access and/or manipulate data stored, for example, by a content server (160), via the application server (150), described below. In one or more embodiments of the technology, the client application or elements of the client application may be customized based on the needs of a specific group of users, i.e., the client application may be tenant-specific. Further, the client application may interface with a corresponding customized tenant application (154A, 154B) on the application server (150). For example, employees in the engineering department of a company and employees of the human resources department may have different requirements regarding data to be accessed, the presentation of the data to be accessed, the ability to manipulate the data, etc. Accordingly, features of both the client application (116) and the tenant application (154A, 154B) may differ between the engineering department and the human resources department.

In one or more embodiments of the technology, users with similar requirements are considered to form a particular tenant group. For example, users in the same department of an organization and/or users working on particular business content may have similar requirements. In FIG. 1, the computing devices (112A) and (112B) may serve users with similar requirements, organized under tenant group A (110A), whereas computing device N (112N) may serve a user with different requirements organized under tenant group B (110B). Those skilled in the art will appreciate that a single computing device may be associated with users that are part of different tenant groups.

Continuing with the discussion of FIG. 1, the system (100), in accordance with one or more embodiments of the technology, includes the application server (150). The web browsers (114) of the computing devices (112A-112N) may connect to the application server to communicate with the tenant applications (154A, 154B) for example, in order to enable users to access the content located on the content server (160), and to process and manipulate the content. The application server may be a computing device that may include physical or virtual server hardware, including at least a processor, memory, persistent storage, and a communication interface. The application server (150) may be on-premises, operated by a legal entity (e.g. a company). Alternatively, the application server may be provided by a third party, e.g., in a datacenter. Further, the application server may be cloud-based. Although a single application server (150) is shown in FIG. 1, components of the application server may be distributed over multiple computing devices, either locally or remotely. The application server may be connected to a network (e.g., a local area network (LAN), a wide area network (WAN) such as the Internet, mobile network, or any other type of network) via a network interface connection (not shown), thereby enabling the application server to communicate with the computing devices (112A-112N), the content server (160) and/or distributed components of the application server.

In one or more embodiments of the technology, the application server (150) hosts a master application (152) and one or more tenant applications (154A, 154B).

The master application (152), in accordance with one or more embodiments of the technology, may be a generic application template, built based on industry use cases or organizational requirements that address the needs of the organization, e.g., the company using the system (100). The master application may include, for example, HTML, JavaScript and CSS instructions that provide the functionalities addressing the needs of the organization, such as, for example, the capability to retrieve and visualize text documents. The master application (152) may form a template for the tenant applications (154A, 154B) that may be derived from the master application (152).

The tenant applications (154A, 154B), in accordance with one or more embodiments of the technology, may be derived from the master application (152), and may inherit functionalities of the master application. In one embodiment of the technology, additional requirements, not addressed by the master application, may be met by the tenant application by incorporating custom-configured features. For example, the tenant application (154A) may be customized for the engineering department, whereas the tenant application (154B) may be customized for the human resources (HR) department of a company.

Continuing with the discussion of FIG. 1, the system (100), in accordance with one or more embodiments of the technology, includes the content server (160). The content server may hold content that may be accessible to users of the system (100) via the client application (116) and application server (150). The content may be stored on the content server (160) using any type of non-volatile storage, including, for example, a hard disk drive, a redundant array of independent disks (RAID), network attached storage (NAS), cloud storage, etc. Further, at least some of the content of the data repository may alternatively or in addition be stored in volatile memory, e.g., in RAM. The content stored on the content server may be any type of content and may include, for example, inventories, sales figures, technical drawings audio files, video files, images, metadata, health records, social media posts, text documents, and any other type of structured and/or unstructured data that users of the system (100) may need to access. Accordingly, depending on the nature of the content to be stored, any format suitable for the storage of the content, including, for example, hierarchical, relational and/or object oriented databases designed for the storage and retrieval of structured and/or unstructured data. may be used.

The components of the system (100), i.e., the computing devices A-N (112A-112N), the application server (150), and the content server (160) may communicate using any combination of wired and/or wireless communication protocols. In one embodiment of the technology, the computing devices, and the application server communicate via a wide area network (e.g., over the Internet), and/or a local area network (e.g., an enterprise or home network). The communication between the components of the system (100) may include any combination of secured (e.g., encrypted) and non-secured (e.g., un-encrypted) communication. The manner in which the components of the system communicate may vary based on the implementation of the technology.

One skilled in the art will recognize that the architecture of the system is not limited to the components shown in FIG. 1. For example, any number of client applications, for any number of tenant groups may access any number of tenant applications, without departing from the technology. Further, the system may include additional components, for example, tools for the development of the master application and for deriving the tenant applications from the master application, and for customizing the tenant applications. In addition, the storage of user-accessible content may involve components in addition to the content server. For example, the system may include a file storage system and a database, in addition to the content server. In such a system, the file storage system may store the content, the database (e.g. a relational database) may store metadata identifying the content, and the content server may provide the interface for the application server to provide access to the content.

Figure 2A:
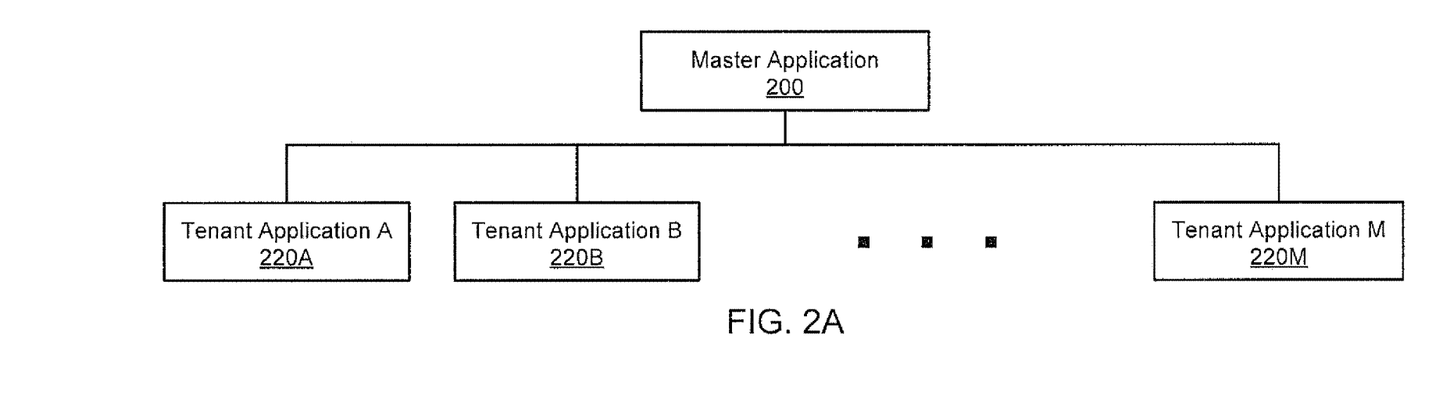
FIGS. 2A and 2B show systems in accordance with one or more embodiments of the technology.
Figure 2B:
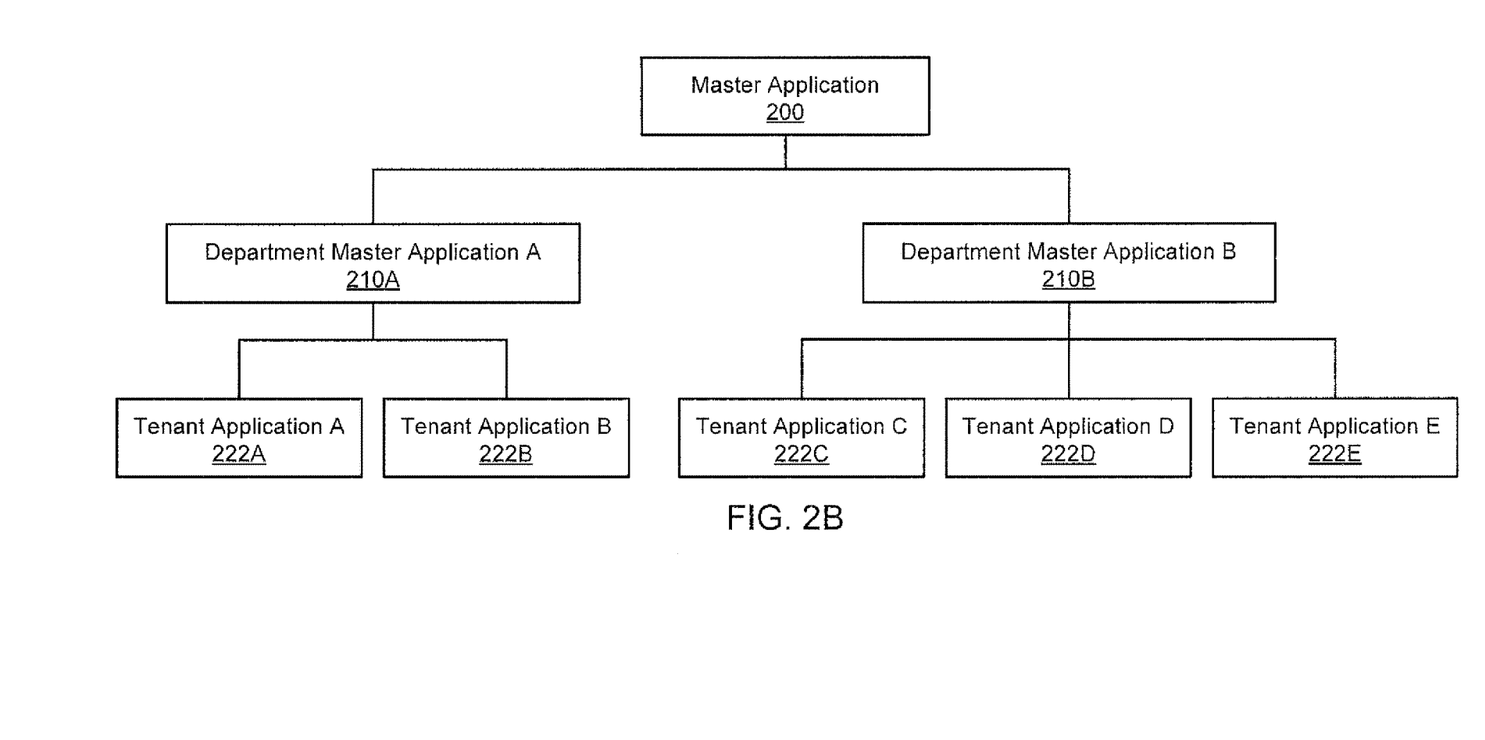

FIGS. 2A and 2B show application hierarchies in accordance with one or more embodiments of the technology. In FIG. 2A, tenant applications A-M (220A-220M) may directly inherit functionalities from a master application (200). The functionalities may, for example, include various methods for accessing, manipulating and storing documents in the system. The master application may be configured to allow all of the above functionalities to be performed on any type of document. Depending on the configuration of a tenant application, the tenant application may allow all or only some of the above functionalities to be performed on all or a subset of the documents.

Consider, for example, a scenario where tenant application A (220A) is configured to serve users in the engineering department of a company, and tenant application B (220B) is configured to serve users in the human resources department of the company. In this scenario, tenant applications A and B inherit all of the above functionalities from the master application (200). However, tenant application A may only allow a user to access, manipulate and store engineering-related documents, whereas tenant application B may only allow a user to access, manipulate and store human resource-related documents.

FIG. 2B includes an additional layer of inheritance. The department master applications A and B (210A and 210B) may directly inherit functionalities from a master application (200), tenant applications A and B (222A and 222B) may directly inherit functionalities from department master application A (210A) and tenant applications C-E (222C-222E) may directly inherit functionalities from department master application B (210B). This type of inheritance scheme may be used to further discriminate between different tenant groups having different requirements. Consider, for example, a scenario where department master application A (210A) was configured to include functionalities to access, manipulate and store human resource-related documents. These functionalities are inherited by the tenant applications A and B (222A and 222B). Tenant application A is designed for senior human resource staff that may have access to all human resource-related information. Accordingly, tenant application A (222A) provides all inherited functionalities to the users accessing tenant application A. Tenant application B (222B) is designed for junior human resource staff that has restricted access to human resource information. Junior human resource staff is only allowed to access (read), but not to manipulate and store, human resource information. Further, junior human resource staff cannot see salary information. Accordingly, tenant application B provides only a subset of all inherited functionalities to the users accessing tenant application B. In addition, tenant application B is parameterized to filter and hide certain information (salaries).

One skilled in the art will recognize that the above inheritance schemes are not limited to the examples presented in FIGS. 2A and 2B. Inheritance schemes in accordance with one or more embodiments of the technology may include any number of hierarchies with any degree of complexity.

Figure 3:
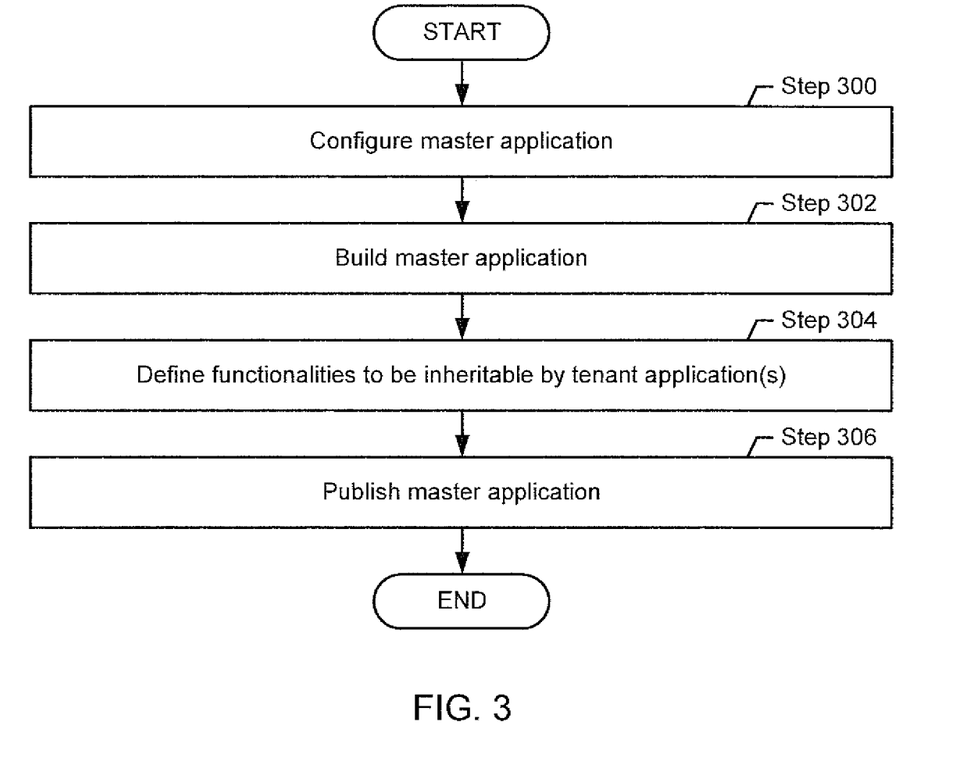
FIGS. 3 and 4 show flowcharts in accordance with one or more embodiments of the technology.
Figure 4:
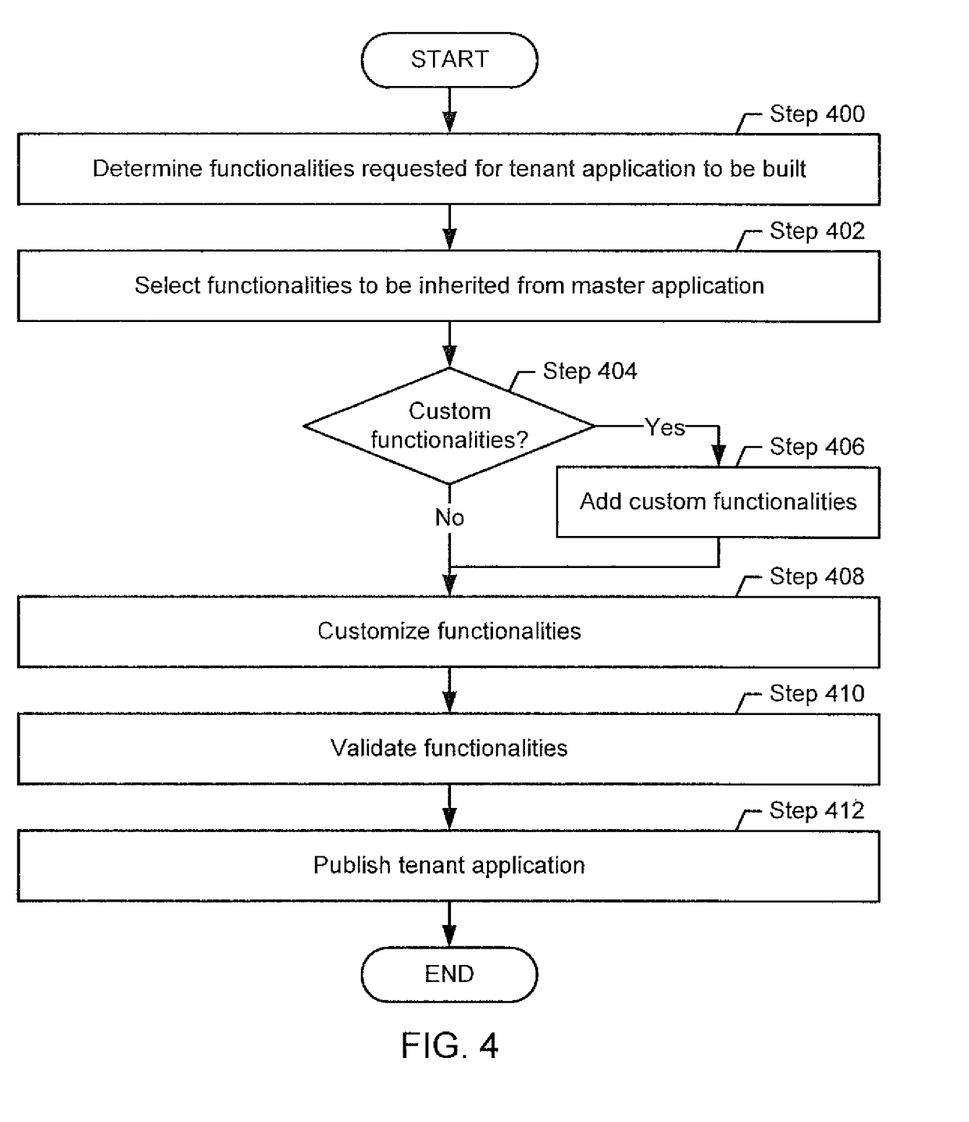

FIGS. 3 and 4 show flowcharts in accordance with one or more embodiments of the technology.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 3 and 4 may be performed in parallel with any other steps shown in FIGS. 3 and 4 without departing from the technology.

FIG. 3 shows a method for generating a master application, in accordance with one or more embodiments of the technology. The master application may be used as a template for tenant applications. The master application may include functionalities that are commonly used by all or multiple users of the tenant applications. Such functionalities may include, for example, functionalities for checking in and/or out documents, composing standardized emails, etc. These functionalities, implemented in the master application, may be inherited by the tenant application. The steps described in FIG. 3 may establish a fully parameterized master application. In one or more embodiments of the technology, functionalities of the master application may be inherited by tenant applications. The tenant application may then be instantiated, thus enabling the instantiated tenant applications to serve users. The master application may or may not be directly accessed by users and may therefore not be instantiated.

Turning to FIG. 3, in Step 300, the master application is configured. Configuration of the master application may include the specification of databases and/or servers that users may need to access. The configuration of the master application may further include the specification of rules that may be universal to all users of the system, e.g. in the form of business rules. For example, these rules may implement mechanisms that handle access to content stored in a database and/or on a server, and may provide access control based on a user's level of privileges. The configuration of the master application may be performed by an administrator of the system.

In Step 302, the master application is built, based on the configuration specified in Step 300. The built master application may provide an interface to the databases and/or servers of the system, but may only provide limited or no functionalities to a user. Functionalities may be added to the initial master application built in Step 302, in subsequent steps. The master application may be stored, for example, in a repository on the application server or in a repository located on a server or storage device connected to the application server.

In Step 304, the functionalities to be inheritable by tenant applications are selected. Functionalities to be inherited may be functionalities required by the users of the system. If for example, the human resource department of a company requires functionalities A and B, and the engineering department of the same company requires functionalities B, C and D, the functionalities A-D may be included in the master application, and may then be inherited by the tenant applications designed specifically for the engineering and human resource departments. In one or more embodiments of the technology, these functionalities may include functionalities that may be provided to users via a tenant application without modifications (i.e., the tenant application provides the functionalities, as inherited from the master application), and/or it may include functionalities that may be further customized, as described below with reference to FIG. 4.

In one or more embodiments of the technology, defining a functionality to be inheritable by tenant applications involves selecting the functionality and parameterizing the functionality. A functionality to be selected may include software instructions for performing at least one step of an activity required by users of the tenant application and may be, for example, a functionality for checking in and/or checking out a document. Parameterizing the functionality may include, for example, defining a scope, i.e., specifying the types of documents the functionality applies to, and additional configuration details, such as, for example, the location of the document.

Defining a functionality may be performed as follows:

(1) The functionality is selected. The functionality may be selected, for example from a list of functionalities, i.e., the system may include a set of functionalities that have been implemented and may therefore be selected without requiring manual implementation of the functionality.

(2) The scope of the functionality is defined. Depending on the type of functionality selected, the scope may be, for example, a document (e.g. an address list) or a user role (e.g., administrator, human resource user, engineering user, etc.). The scope may determine the context in which the functionality may be used. For example, the above functionality may be used to access the address list, and the functionality may be performed by an human resource user. Further, the definition of the scope may include additional details, such as, for example, whether read access, write access, full access or a default access is granted.

In one embodiment of the technology, the selection of functionalities and the definition of the scope of the functionalities may be performed using a graphical user interface that includes a configuration matrix. Functionalities to be selected may be provided along a first axis of the configuration matrix, and scopes to be selected may be provided along a second axis of the configuration matrix once the functionalities and scopes provided by the master application have been established. Functionalities and scopes may then be selected by placing checkmarks at the intersections of the desired scopes and functionalities.

(3) The functionality is parameterized. The parameterization of a functionality may determine the behavior of the functionality, options displayed to a user of the functionality, etc. For example, if the functionality is used to generate a new address list, the parameterization may automatically assign a name to the address list, based on naming conventions determined in the parameterization.

In one or more embodiments of the technology, performing (1), (2) and (3) may be used to define all functionalities to be included in the master application. Defining the functionalities to be included in the master application may thus be accomplished without requiring manual implementation (i.e. coding) of these functionalities. Some or all of the elements established in (1), (2) and (2) may be inheritable by the tenant applications. Further, these elements, if permitted, may be removed, modified and/or enhanced by the tenant applications.

In Step 306, the configuration of the master application, established in Step 304, is stored, for example, in a repository on the application server, or in a repository located on a server or storage device connected to the application server. The configuration of the master application may be stored as a parameter set that may be used to configure the master application prior to instantiation of the master application, if execution of the master application is permitted. In one or more embodiments of the technology, the master application may, however, not be executable, i.e., it may merely serve as a template for the tenant applications that may be executable.

FIG. 4 shows a method for generating a tenant application, in accordance with one or more embodiments of the technology. The tenant application may be used to provide functionalities to users. More specifically, a particular tenant application may provide functionalities to a group of users with particular requirements. The tenant application may inherit functionalities from the master application and may further be customized to meet the users' requirements. The method described in FIG. 4 may be performed separately for each group of users having particular requirements. Accordingly, additional tenant applications may be generated by executing the steps described in FIG. 4 to meet the requirements of other groups of users. The functionalities of the tenant application, in accordance with one or more embodiments of the technology may be inherited from the previously generated master application. The functionalities inherited from the master application may then be customized to meet the requirements of the users of the tenant application, if necessary. Further, additional functionalities may be included as necessary, and unnecessary features, inherited from the master application may be removed. The tenant application, generated as described in FIG. 4 may then be instantiated as a multi-tenant application, i.e., multiple users with similar requirements may connect to the application, for example using a web browser, in order to interact with the system, thus being able to perform tasks requiring the functionalities provided by the tenant application.

Turning to FIG. 4, in Step 400, the functionalities requested for the tenant application are determined. Functionalities may be requested by a service requester that is authorized to request the provisioning of a tenant application. The service requester may request a set of functionalities required by members of the group for performing particular tasks. In the request, the service requester may provide details necessary for configuring the requested fimctionalities. For example, the request may include information regarding databases and folders to be accessed, user roles to be configured (with different user roles including different levels of access to the system and data), users, user roles, access control lists, etc.

In Step 402, the functionalities of the tenant application, to be inherited from the master application, are selected, based on the functionalities specified in step 400. In one embodiment of the technology, the functionalities of the tenant application may be selected from the inheritable functionalities of the master application, previously determined in Step 304. Analogous to the previously described selection of functionalities for the master application, the selection of functionalities for the tenant application may also include determining a scope for each of the selected functionalities. The scope used in the tenant application may be identical to the scope used in the master application, or it may be narrower. Consider, for example, a scenario where a tenant application is generated for entry level human resource employees. These employees are only permitted to view content, without having permission to modify and/or write content. Although the scope of the corresponding functionality in the master application may grant full privileges, the scope of the functionality in the tenant application, inherited from the master application, is limited to reading content only.

In one embodiment of the technology, the selection of functionalities and the definition of the scope of the functionalities may be performed in a configuration matrix, similar to the configuration matrix used for configuring the functionalities of the master application. The functionalities and scopes shown in the configuration matrix of the tenant application may be determined based on functionalities and scopes selected for the master application. For example, the configuration matrix of the tenant application may, at least initially, only show functionalities that were selected for the master application, and may only allow the selection of scopes that are equal or narrower than scopes selected for the master application. Additional functionalities may however be added to the tenant application, and scopes may be expanded in a separate step, as further described below.

In one embodiment of the technology, the functionalities of the tenant application and their configuration, including their scope may be established automatically. A system administrator or supervisor may then review the automatically generated functionalities of the tenant application for completeness and accuracy.

In Step 404, a determination is made about whether custom functionalities were specified by the service requester. Custom functionalities may include functionalities, that may not be inheritable by the master application, for example, because the master application did not include these functionalities. If no custom functionalities were requested, the method may proceed to Step 408. If a determination is made that custom functionalities were requested, the method may proceed to Step 406.

In Step 406, custom functionalities are added to the tenant application. Custom functionalities may include functionalities that are not included in the master application and that therefore are not inheritable by the tenant application, from the master application. In one or more embodiments of the technology, the process of adding custom functionalities is similar to the process of defining the functionalities of the master application in Step 304, as previously described.

Various degrees of customization may be accomplished by selecting functionalities to be inherited from the master application (Step 402), and/or by selecting custom functionalities (Step 406). For example, the tenant application may provide functionalities identical to the master application, if all functionalities of the master application are selected with their original scope. The tenant application may provide functionalities that are entirely different from the functionalities of the master application, if none of the functionalities of the master application are selected in Step 402, and if custom functionalities are selected in Step 406.

In Step 408, the functionalities of the tenant application are customized. Customizing a functionality, in accordance with one or more embodiments of the technology, may include updating the parameters of functionalities inherited from the master application, and adjusting the scope as needed. Referring back to the example previously used for illustrating the parameterization of a functionality, the name that is automatically assigned to newly generated address lists may need to be changed to meet specific user requirements. For example, the name may need to include the date of address list generation. Further, the scope may be updated to include user roles, users assigned to the user roles, permissions, a choice of documents or types of documents, etc. In one embodiment of the technology, the information used to customize the functionalities may be obtained from the service requester. Based on the obtained information, the customization may be automatically performed. Alternatively a system administrator or supervisor may manually customize the functionalities of the application.

For custom functionalities, added in Step 406, the parameterization of the added custom functionalities is performed, as previously described in Step 304.

In Step 410, the functionalities selected in Steps 402 and 406 are validated. In one or more embodiments, the functionalities may be inspected to verify that they have been inherited or generated successfully. The inspection may include an analysis for conflicting settings, e.g., for lacking or improperly configured permissions. Further, the scopes of the inherited or generated functionalities may be verified. Also, interdependencies of functionalities, as well as dependency of functionalities from other client application elements may be analyzed to verify that all required elements are available and accessible, given the level of privileges of the users accessing the tenant application. For example, the validation may include an inspection of whether the inherited or generated functionalities are properly connected to user interface elements of the client application, such that a user can access them. In addition, the function of content management operations necessary for accessing of, for example, data stored on the content server (including, for example, import, export, versioning and search) may be verified. Conflicts, potential conflicts and items that failed the validation may be reported to the system administrator or supervisor. Further, the report to the user interface may include notifications regarding missing or non-accessible storage locations required by an inherited or generated functionality, the need for creating roles and/or users, missing mappings of users to roles, missing or incomplete access control lists for the storage locations, etc. One skilled in the art will recognize that the above described validation is not limited to these exemplary criteria to be checked. Rather, any criteria that may impair the function and/or performance of the tenant application to be published may be validated.

In Step 412, the configuration of the tenant application is stored, for example, in a repository on the application server or in a repository located on a server or storage device connected to the application server. The configuration of the tenant application may be stored as a parameter set that may be used to configure the tenant application prior to instantiation of the tenant application. Storing the configuration of the tenant application may complete the deployment of the tenant application. Once the tenant application has been deployed, a notification may be sent to the intended users of the tenant application. The notification may include instructions for accessing the tenant application. A user then may access the tenant application, for example, by clicking a URL link in the web browser of the user's computing device.

In one or more embodiments of the technology, the system is used to implement, monitor and enforce compliance. The system may ensure that users of the system adhere to certain standards and regulations, e.g. national laws, privacy laws, organization-internal standards, etc. Compliance may be implemented in functionalities on an organization-wide level, using the master application. Compliance may then be inherited by the client application, thus ensuring that all users interacting with the client applications, are required to adhere to the imposed standards and regulations. Further, the compliance rules inherited from the master application may be customized to satisfy compliance requirements specific to certain user groups.

Figure 5:
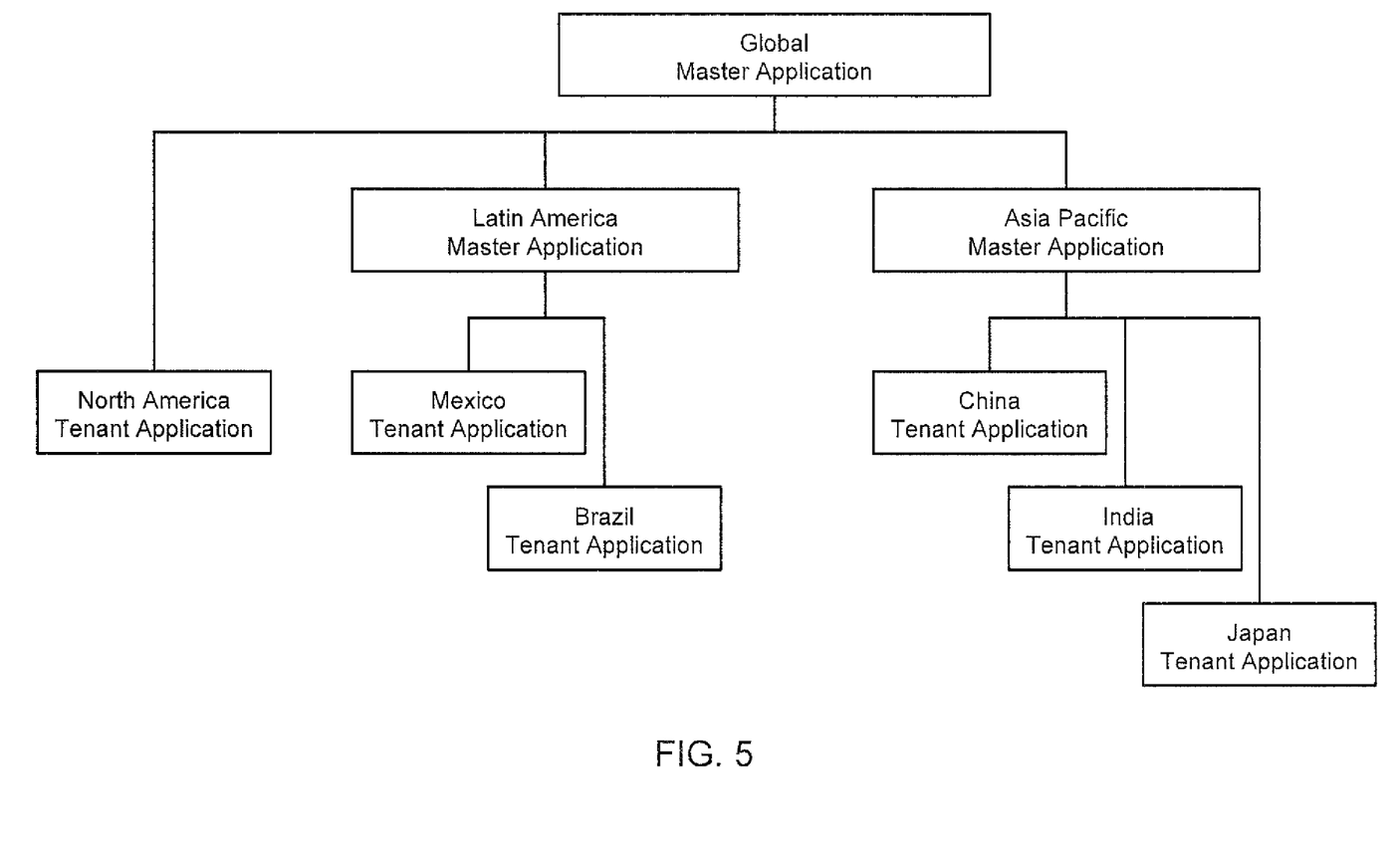
FIG. 5 shows a system in accordance with one or more embodiments of the technology.

FIG. 5 shows an example of a system in accordance with one or more embodiments of the technology. The system is operated by a globally-operating organization and was established in order to enforce compliance with company-internal standards, among other reasons. One requirement is that sensitive customer data is encrypted, and that the encryption meets certain standards. Thus, any database read/write operation is required to include appropriate encryption/decryption algorithms, as specified by the functionalities of the application. These organization-internal regulations are implemented at a global level by functionalities of the global master application. The functionalities are inherited by regional applications, where they may be customized as necessary, for example based on regional laws. In the example of document encryption, different regions and countries have different privacy laws and therefore require different levels of protection (i.e., encryption). Further, not all types of encryption algorithms are available in all geographical regions because certain encryption technologies may not be exported to other countries. Accordingly, the functionalities inherited by the regional applications from the global master application, are customized to meet these regional requirements.

Turning to FIG. 5, the North America tenant application directly inherits functionalities from the global master application. In contrast, the Mexico, Brazil, China, India and Japan tenant applications indirectly inherit functionalities from the global master application via the Latin America and Asia Pacific master applications, respectively, thus providing the option of multiple levels of customization.

The configuration shown in FIG. 5 is further used to enforce location specific restrictions to database access. Depending on the location, full access, or read-only access is granted. The master application is set up to provide full access. Some regional tenant applications (including the North America, India and Japan tenant applications) inherit full access privileges from the master applications, either directly or indirectly via regional master applications. Other tenant applications inherit read only access or no access at all.

Further, the applications include a functionality that automatically determines the location of a user accessing an application. The location of a user may be determined, for example, based on an IP address. The functionality is implemented by the master application and is inherited by all tenant applications. A user accessing the system using a tenant application in North America, India or Japan consequentially has full access to the database, whereas a user connecting from other regions has either limited access or no access at all.

In the system presented in FIG. 5, the concept of inheritance of functionalities is further used to enforce local laws requiring local storage of local customer information. For example, data related to business conducted in North America may only be kept in data storage that is physically located in North America. Analogous to the previous example, the functionalities implementing this requirement is included in the global master application is propagated to all local tenant applications via inheritance.

The methods described in FIGS. 3 and 4 are not limited to the above examples illustrating the method for providing software functionalities to users of multi-tenant applications via inheritance, based on geographic location-specific requirements, but rather are universally applicable to a wide range of scenarios.

Embodiments of the technology may enable a legal entity, e.g. an organization using the previously described system, to generate applications satisfying the requirements of different groups of users. Custom applications (tenant applications) may be derived from an application template (master application), from where the tenant applications may inherit functionalities. Commonly used functionalities may therefore become reusable, thus reducing build and deployment time and cost. Additional features, not existing in the master application, may be provided in a tenant application, thus providing the flexibility to accommodate non-standard requirements.

The multi-tenant architecture with tenant applications inheriting features from a master application may be particularly suitable for cloud based offerings of functionalities as software as a service (SaaS). In such a scenario, a tenant application may be rapidly provided based on the requirements of a customer subscribing to specific functionalities.

Further, the multi-tenant architecture may enable the sharing of infrastructure, including, application servers, content servers, databases etc., between different groups of users interacting with different tenant applications, within and across legal entities with similar and different requirements.

Embodiments of the technology may further be particularly suitable for satisfying compliance needs, e.g., requirements governed by national, local or company-internal standards. Compliance may be implemented on the level of the master application and may be inherited by the tenant application, thus automatically enforcing compliance by all users accessing the tenant applications. Compliance may further be parameterized in order to accommodate variations in compliance requirements between user groups, for example, based on geographic location.

Figure 6:
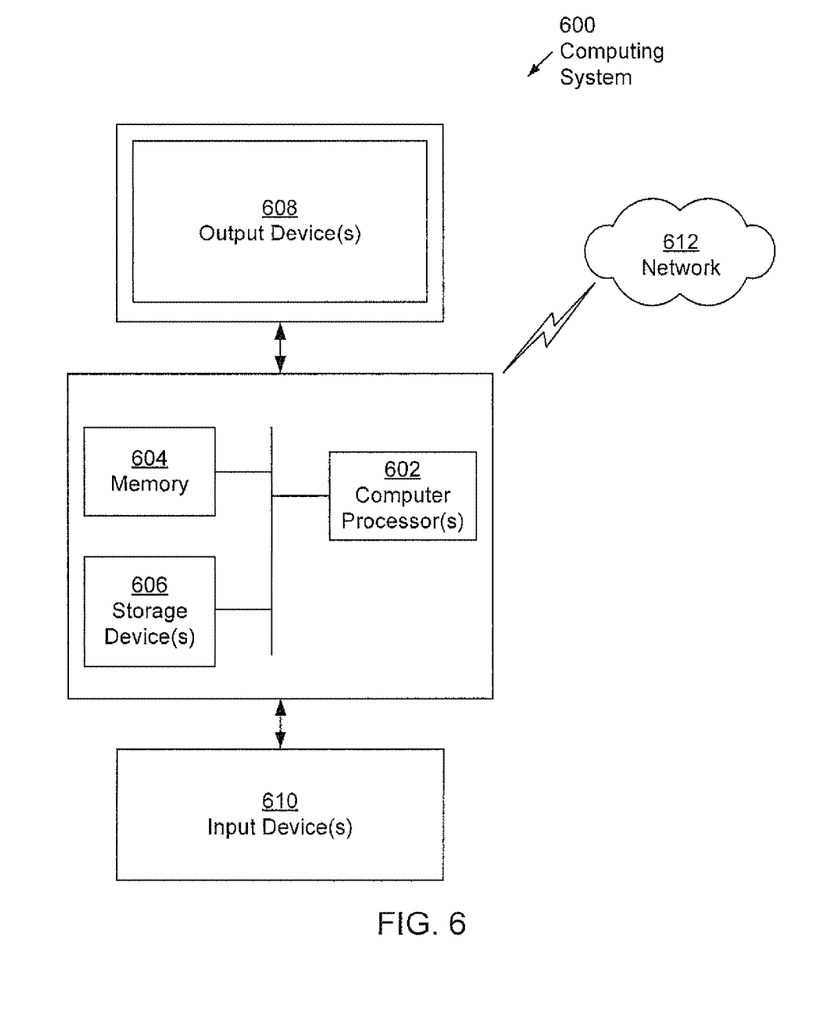
FIG. 6 shows a computing system in accordance with one or more embodiments of the technology.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory.

The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for providing software functionalities to users of multi-tenant applications via inheritance, comprising:
    defining a plurality of functionalities to be inheritable by a tenant application, in a master application, comprising:
        selecting the plurality of functionalities from a set of implemented functionalities; and
        defining a scope for the selected plurality of functionalities,
        wherein each of the plurality of functionalities is a customization to the master application specific to a first plurality of users;
    publishing the master application after defining the plurality of functionalities; and
    after publishing the master application:
        receiving a first request to generate the tenant application, wherein the first request specifies the master application and a first functionality of the plurality of functionalities to be inheritable by the tenant application;
        generating the tenant application in response to the first request, wherein the tenant application comprises the first functionality and a first custom functionality, wherein the first custom functionality is not provided in the master application;
        publishing the tenant application to a second plurality of users, wherein the first plurality of users is a superset of the second plurality of users;
        receiving a second request to access the published tenant application from a user of the second plurality of users; and
        validating the first functionality, prior to publishing the tenant application, wherein validating the first functionality comprises verifying that elements required by the first functionality are accessible to the user.

2. The method of claim 1, wherein defining the plurality of functionalities further comprises:
    parameterizing the selected plurality of functionalities.

3. The method of claim 1, wherein the scope of the selected plurality of functionalities comprises at least one selected from the group consisting of a user role, a document, and access privileges.

4. The method of claim 1, wherein selecting the plurality of functionalities from the set of implemented functionalities comprises selecting, in a configuration matrix, the first functionality.

5. The method of claim 1, further comprising:
    receiving a third request to generate a second tenant application, wherein the third request specifies the master application and the first functionality to be inheritable by the second tenant application;
    generating the second tenant application comprising a second custom functionality in response to the third request, wherein the first functionality is customized to obtain the second custom functionality;
    publishing the second tenant application to a third plurality of users; and
    receiving a fourth request to access the published second tenant application from a user of the third plurality of users.

6. The method of claim 5, wherein customizing the first functionality of the published second tenant application comprises at least one selected from the group consisting of changing the scope of the first functionality and re-parameterizing the first functionality.

7. The method of claim 1, further comprising:
    obtaining a third functionality, not inherited from the master application, for the tenant application,
    wherein the published tenant application comprises the third functionality.

8. A non-transitory computer readable medium (CRM) storing instructions for providing software functionalities to users of multi-tenant applications via inheritance, comprising:
    defining a plurality of functionalities to be inheritable by a tenant application, in a master application, comprising:
        selecting the plurality of functionalities from a set of implemented functionalities; and
        defining a scope for the selected plurality of functionalities,
        wherein each of the plurality of functionalities is a customization to the master application specific to a first plurality of users;
    publishing the master application after defining the plurality of functionalities; and
    after publishing the master application:
        receiving a first request to generate the tenant application, wherein the first request specifies the master application and a first functionality of the plurality of functionalities to be inheritable by the tenant application;
        generating the tenant application in response to the first request, wherein the tenant application comprises the first functionality and a first custom functionality, wherein the first custom functionality is not provided in the master application;
        publishing the tenant application to a second plurality of users, wherein the first plurality of users is a superset of the second plurality of users;
        receiving a second request to access the published tenant application from a user of the second plurality of users; and
        validating the first functionality, prior to publishing the tenant application, wherein validating the first functionality comprises verifying that elements required by the first functionality are accessible to the user.

9. The non-transitory CRM of claim 8, wherein the scope of the selected plurality of functionalities comprises at least one selected from the group consisting of a user role, a document, and access privileges.

10. The non-transitory CRM of claim 8, wherein the instructions for providing software functionalities to users of multi-tenant applications via inheritance further comprise:
    receiving a third request to generate a second tenant application, wherein the third request specifies the master application and the first functionality to be inheritable by the second tenant application;
    generating the second tenant application comprising a second custom functionality in response to the third request, wherein the first functionality is customized to obtain the second custom functionality;

publishing the second tenant application to a third plurality of users; and
receiving a fourth request to access the published second tenant application from a user of the third plurality of users.

11. The non-transitory CRM of claim 10, wherein customizing the first functionality of the published second tenant application comprises at least one selected from the group consisting of changing the scope of the first functionality and re-parameterizing the first functionality.

12. The non-transitory CRM of claim 8, wherein the instructions for providing software functionalities to users of multi-tenant applications via inheritance further comprise:
obtaining a third functionality, not inherited from the master application, for the tenant application,
wherein the published tenant application comprises the third functionality.

13. A system for providing software functionalities to users of multi-tenant applications via inheritance, comprising:
a computing device comprising a computer processor;
an application server, executing on the computer processor, and configured to:
obtain a definition of a plurality of functionalities to be inheritable by a tenant application, in a master application,
wherein the plurality of functionalities is selected from a set of implemented functionalities,
wherein a scope for the plurality of functionalities is defined, and
wherein each of the plurality of functionalities is a customization to the master application specific to a first plurality of users;
publish the master application after the definition of the plurality of functionalities is obtained; and
and after publishing the master application:
receive a first request to generate the tenant application, wherein the first request the master application and a first functionality of the plurality of functionalities to be inheritable by the tenant application;
generate the tenant application in response to the first request, wherein the tenant application comprises the first functionality and a first custom functionality, wherein the first custom functionality is not provided in the master application;
publish the tenant application to a second plurality of users, wherein the first plurality of users is a superset of the second plurality of users;
receive a second request to access the published tenant application from a user of the second plurality of users; and
validate the first functionality, prior to publishing the tenant application, wherein validating the first functionality comprises verifying that elements required by the first functionality are accessible to the user.

14. The system of claim 13, wherein the scope of the plurality of functionalities comprises at least one selected from the group consisting of a user role, a document, and access privileges.

15. The system of claim 13, wherein the application server is further configured to:
receive a third request to generate a second tenant application, wherein the third request specifies the master application and the first functionality to be inheritable by the second tenant application;
generate the second tenant application comprising a second custom functionality in response to the third request, wherein the first functionality is customized to obtain the custom functionality;
publish the second tenant application to a third plurality of users; and
receive a fourth request to access the published second tenant application from a user of the third plurality of users.

16. The system of claim 15, wherein customizing the first functionality of the published second tenant application comprises at least one selected from the group consisting of changing the scope of the first functionality and re-parameterizing the first functionality.

17. The system of claim 13, wherein the application server is further configured to:
obtain a third functionality, not inherited from the master application, for the tenant application,
wherein the published tenant application comprises the third functionality.

* * * * *

UNITED STATES PATENT AND TRADEMARK OFFICE
CERTIFICATE OF CORRECTION

PATENT NO. : 10,484,483 B1
APPLICATION NO. : 14/871548
DATED : November 19, 2019
INVENTOR(S) : Gupta et al.

Page 1 of 1

It is certified that error appears in the above-identified patent and that said Letters Patent is hereby corrected as shown below:

In the Claims

Column 15, Line 35, in Claim 13, the phrase "and and after" should read -- and after --.

Signed and Sealed this
Twenty-first Day of January, 2020

Andrei Iancu
*Director of the United States Patent and Trademark Office*